United States Patent [19]

Atchley

[11] 3,722,743
[45] Mar. 27, 1973

[54] CONVEYOR MECHANISM FOR ARTICLE DISPENSING APPARATUS
[75] Inventor: Richard C. Atchley, Charlotte, Mich.
[73] Assignee: Hoover Ball and Bearing Company, Saline, Mich.
[22] Filed: Mar. 10, 1971
[21] Appl. No.: 122,761

[52] U.S. Cl..................................221/77, 198/195
[51] Int. Cl.................................................B65g 1/12
[58] Field of Search........198/195, 199, 198; 221/77, 221/78, 81, 241, 242, 76

[56] References Cited

UNITED STATES PATENTS

| 1,718,150 | 6/1929 | Hurxthal et al. | 198/195 X |
| 2,877,888 | 3/1959 | Wittenberger | 198/195 |
| 1,926,662 | 9/1933 | Antoine et al. | 221/77 |
| 2,285,435 | 6/1942 | Holcomb, Jr. | 221/79 |
| 3,048,049 | 8/1962 | Oberholtz | 198/195 X |
| 2,888,165 | 5/1959 | Bookout et al. | 221/77 |

Primary Examiner—Stanley H. Tollberg
Attorney—Olsen & Stephenson

[57] ABSTRACT

Apparatus is disclosed which is adapted for use primarily in vending machines of the coin-operated type. A conveying mechanism is provided which may be used in a variety of different styles of vending machines. The conveying mechanism includes extensible and contractable endless rails on which an endless link conveyor is mounted for travel. Each link of the conveyor is an extruded element having a tray or divider projecting from one surface. Male and female hinge portions project from the other surface at edges thereof for hingedly connecting adjacent links, and the hinge connections are arranged to travel on the rails. Sprockets are mounted adjacent to the rails, and the hinge connections are in mesh with the sprockets so that the turning of one of the sprockets will cause the conveying mechanism to travel on the rails. Various arrangements for loading and ejecting articles to and from the link conveyor are also disclosed.

18 Claims, 16 Drawing Figures

INVENTOR
RICHARD C. ATCHLEY

BY

OLSEN & STEPHENSON
ATTORNEYS

INVENTOR
RICHARD C. ATCHLEY
BY
OLSEN & STEPHENSON
ATTORNEYS

INVENTOR
RICHARD C. ATCHLEY

BY

OLSEN & STEPHENSON
ATTORNEYS

INVENTOR
RICHARD C. ATCHLEY
BY
OLSEN & STEPHENSON
ATTORNEYS

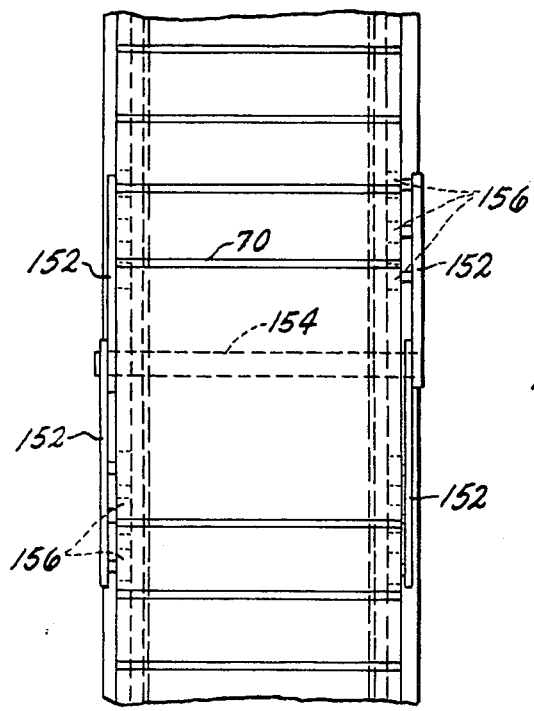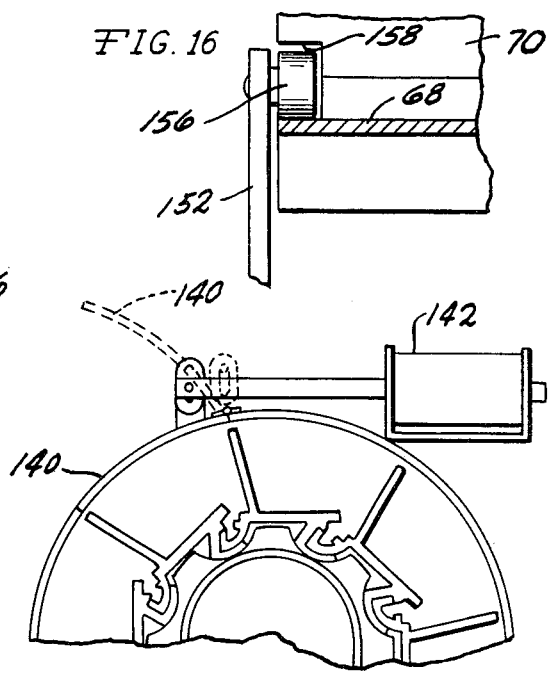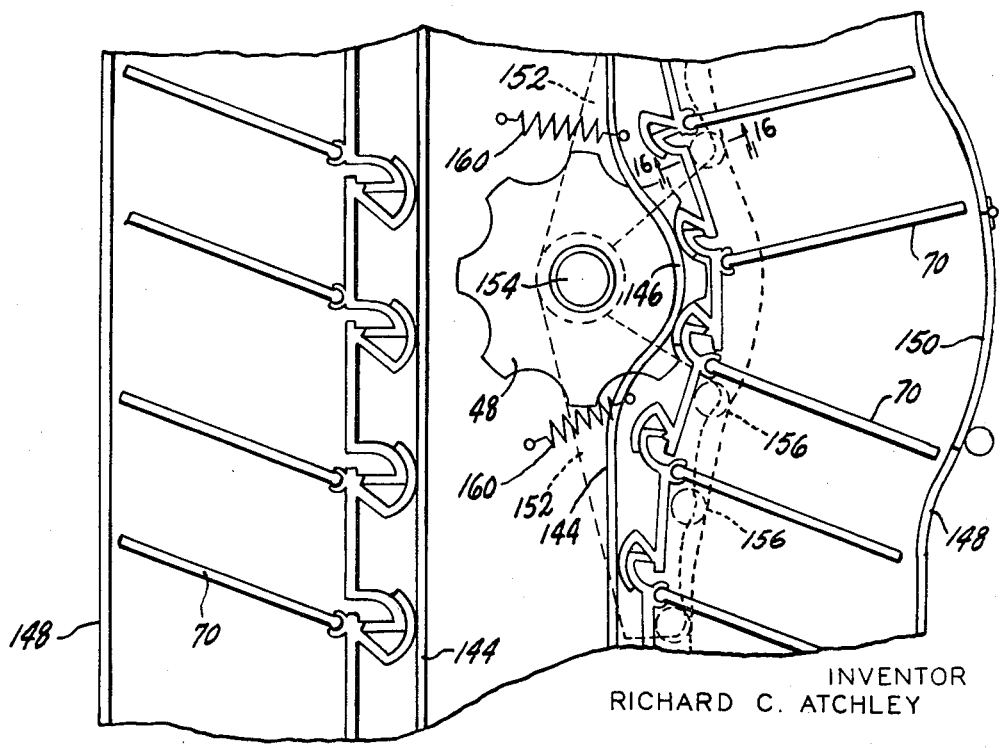

CONVEYOR MECHANISM FOR ARTICLE DISPENSING APPARATUS

BACKGROUND OF THE INVENTION

The present invention relates to article dispensing apparatus, such as coin-operated vending machines and the like, and especially to conveying and dispensing mechanisms that can be used in such machines of different sizes and styles.

Vending machines are now being used in increasing numbers for a relatively wide range of purposes. Not only are they used in the conventional manner to dispense articles such as tobacco and candy, but increased use is being made of them for vending items such as prepared foods in restaurants, food packages in supermarkets, and a variety of other merchandise such as hardware items and the like.

To accommodate customers who purchase these machines, there is an ever increasing need to fabricate vending machines which are styled and arranged to meet the specific needs of the customer, and which are of uniformly high quality and which can be supplied at a reasonably low cost. Also, there is a need to provide machines which can be modified readily from time to time by the customer to fit merchandise that may change periodically in size. Further, there is the need to provide machines which can be used in the most efficient manner by the customer to display a group of articles some of which may be of different sizes and to permit ready selection and dispensing of any one of the articles from the group. To meet these needs of the purchasers of the vending machines, there is an initial requirement on the part of the fabricator of the machines to have conveying and handling mechanisms which are standardized for cost economy, but which can be readily modified prior to or during fabrication to enable the fabricator to meet the specific needs of the purchasers of the vending machines.

SUMMARY OF THE INVENTION

The present invention has overcome many of the shortcomings of the prior art by providing article dispensing apparatus having standardized article conveying, selecting and ejecting mechanisms that enable the manufacturer of a vending machine to design with a reasonable degree of flexibility machines of this character to fit his customers needs, and which also enable a customer of the machine to adapt the machine to his needs as they may change from time to time.

According to one form of the present invention, article dispensing apparatus is provided comprising two parallel endless guide rails having a plurality of sprockets supporting adjacent thereto, and an endless conveyor assembly is arranged for travel on the rails. The conveyor assembly includes a series of conveyor elements hingedly connected edge to edge by interlocking edge portions. Each element defines a plate portion which has a divider projecting from one of its surfaces in a direction away from the rails and male and female edge portions project from the other surface in a direction toward the rails. The edge portions of each element are interlocked with mating edge portions of next adjacent panels to provide the hinge connections. The hinge connections are adapted to travel on the rails and to mesh with the sprockets so that turning of one of the sprockets will cause the endless flexible conveyor assembly to travel on the rails. A housing assembly or retaining shield encloses the conveyor assembly and has access means associated therewith for removal of an article located in the space between two dividers that are adjacent to one another.

The rails are selectively extensible and contractable in length and the conveyor elements are releasably connected together so that the number of the elements can be selectively varied to fit the selected length of the rails. If desired, modified elements which lack dividers may be used at selected intervals along the conveyor assembly so that the space between adjacent pairs of dividers can be varied to meet the size of the article to be inserted therebetween.

The elements of the conveyor assembly are preferably formed by an extrusion operation employing materials such as aluminum or a suitable organic plastic material. It is also contemplated that articles can be ejected from the spaces between adjacent dividers from any of a number of selected locations through access means in the housing or shield of the dispensing apparatus. Likewise, it is also contemplated that the drive mechanism for the conveyor and the ejector mechanism can be operated either manually or from remote control locations.

Thus, it is an object of the present invention to provide improved article dispensing apparatus.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 13 is a fragmentary side elevational view of still another arrangement for gaining access to a storage space wherein the access means may be remotely controlled;

FIG. 14 is a top plan view of still another embodiment of the invention which is especially adapted to provide a horizontal display of articles to be inspected and dispensed;

FIG. 15 is an enlarged side elevation of the embodiment shown in FIG. 14; and

FIG. 16 is a fragmentary section taken on the lines 16—16 in FIG. 15.

DESCRIPTION OF THE PREFERRED EMBODIMENTS

Figure 1:
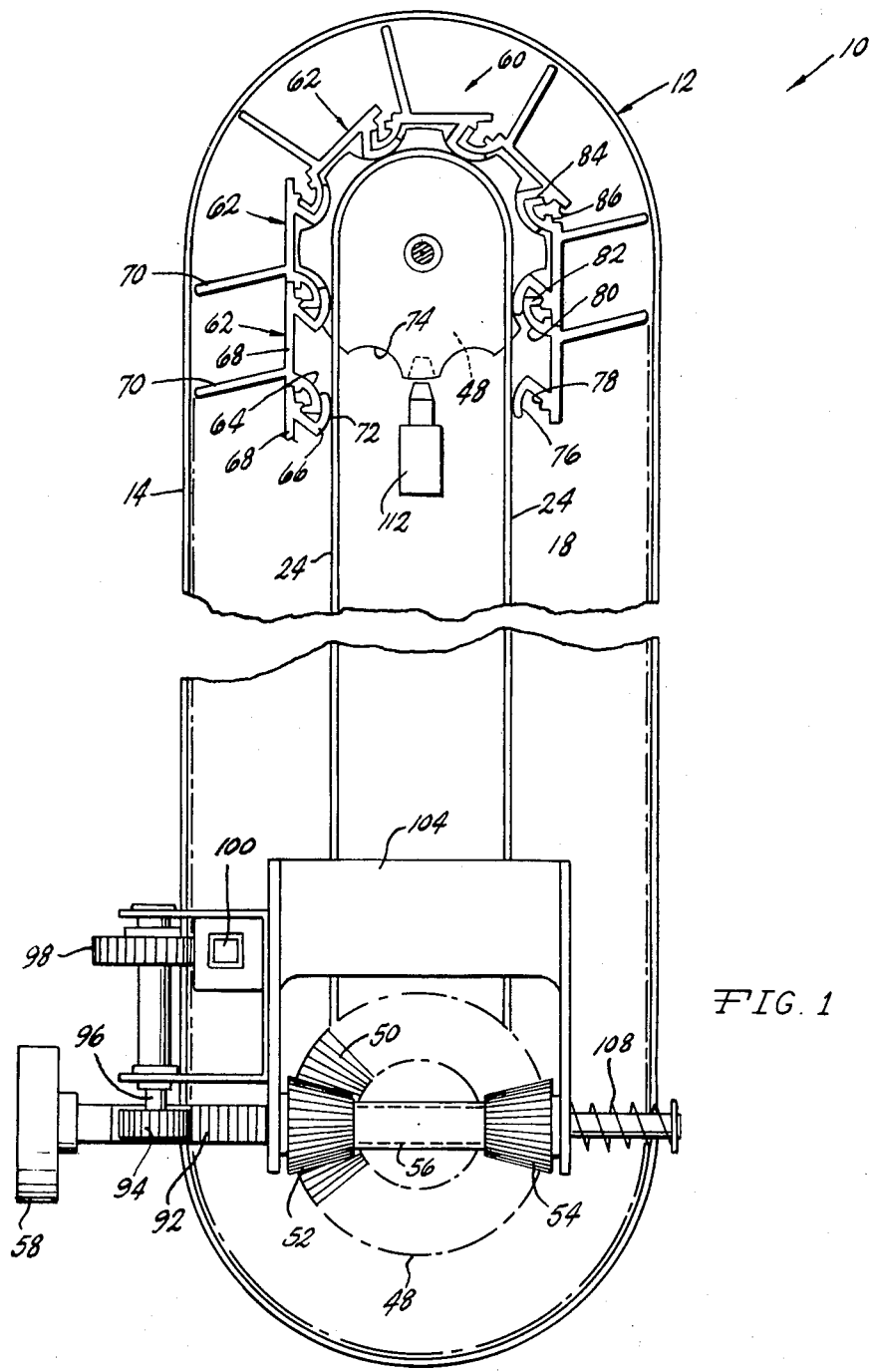
FIG. 1 is a fragmentary side elevational view with portions removed for better illustration purposes of article dispensing apparatus embodying the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a description of the several embodiments of the invention will be given with attention being directed first to FIGS. 1 to 4. The article dispensing apparatus 10 includes a housing assembly 12 shown generally in FIG. 1 in the form of a product retaining shield 14 which preferably is a clear rigid plastic material. Suitable access means or a closure door (not shown) is provided in a side wall adjacent to the shield 14. As will be described, the closure door is arranged to receive articles dispensed from the article dispensing apparatus 10. Other suitable means for loading articles into the apparatus 10 can be provided in the other side wall 18 or at other suitable locations as will presently be described.

Positioned within the housing assembly 12 is a guide rail assembly 22 which includes two endless parallel guide rails 24 and 26. The guide rails 24 and 26 are arranged to be extensible and contractable in length, being formed in two sections which can be advanced or retracted relative to one another and which can be secured in a selected position by means of the plurality of bolts 28. It will be observed that the one section 30 of the guide rail 24 is constructed identically the same as the one section 32 of the guide rail 26, and similarly the other section 34 of the guide rail 24 is constructed identically the same as the other section 36 of the other rail 26. By virtue of this feature, only two standard rail sections need be fabricated. During construction the section 36 is secured to the section 30 by means of a bracket 38, and the section 34 is secured to the section 32 by means of another bracket 40, which again, is formed identically the same as the bracket 38 to permit standardized parts to be employed.

The guide rails 24 and 26 have bearings as at 42 in which the shafts 44, which form part of a conveyor drive assembly 46, are journaled for rotation.

The conveyor drive assembly 46 includes four sprockets 48 which are fitted to the ends of the shafts 44 for rotation therewith. At least one of the sprockets 48 is provided with a crown gear 50 in mesh with the drive pinion 52 and the idler drive pinion 54. The pinions 52 and 54 are mounted on the shaft 56 of the control knob 58 which is located outside the housing assembly 12 for manually operating the conveyor drive assembly 46. As will readily be understood, turning of the control knob 58 will turn the shaft 56 and thereby the drive pinion 52 which is slidably mounted on the square portion of the shaft 56 for rotation therewith. Thus, the one sprocket and its shaft 44 will also be rotated in response to turning of control knob 58.

An endless flexible conveyor assembly 60, FIG. 1, is positioned for travel on the rails 24 and 26. The endless flexible conveyor assembly 60 includes a series of conveyor elements or strips 62 connected edge to edge by interlocking male and female edge portions 64 and 66. Each element has a plate portion 68 from one surface of which a divider 70 projects in a direction away from the rails 24 and 26, and the male and female edge portions 64 and 66 project from the other surface of the plate portion 68 in a direction toward said rails 24 and 26. The interlocking edge portions provide hinge connections, each having a circular outer configuration, as at 72, which is adapted to mesh with the circular configurations or pockets 74 of the sprockets 48, and the hinge connections are also adapted to travel lengthwise on the rails 24 and 26. Thus, when one of the sprockets 48 is rotated by turning of the knob 58, the endless flexible conveyor assembly 60 will be caused to travel on the rails 24 and 26 to any selected location.

The strips or elements 62 are preferably formed by an extrusion operation using materials such as aluminum or organic plastic. When the elements 62 are formed in this manner, each female edge portion 66 will have a concave cylindrical surface the which is opposed by a groove 78 located at the center of the concave cylindrical surface 76. Each male edge portion 64 will have a convex cylindrical surface 80 of the same radius as the concave cylindrical surface 76 and it will have a tongue 82 at its extremity which terminates at the center of the convex cylindrical surface 80. Each male edge portion 64 will then extend lengthwise through the female edge portion 66 of the next adjacent element with the tongue 82 of the male edge portion seated in the groove 78 of the female edge portion and with the concave and convex cylindrical surfaces 76 and 80, respectively, in sliding engagement for relative pivotal movement about the center of the two surfaces. Suitable abutting edge surfaces, as at 84 and 86, are provided to limit the extent of relative pivotal movement between these hinge portions.

From the foregoing description it will be readily understood that the length of the flexible conveyor assembly can easily be altered merely by changing the number of elements or strips 62 in the assembly. This can be accomplished by sliding one of the elements 62 lengthwise relative to the two next adjacent elements so as to disconnect the hinge connections, and additional elements can be added by the same general procedure merely by disconnecting two elements and thereafter inserting additional elements between the two disconnected elements. By virtue of this construction and arrangement, the fabricator of a vending machine can select the length of the guide rails that is desired and thereafter he can assemble a conveyor to fit the selected length of rails.

Figure 5:
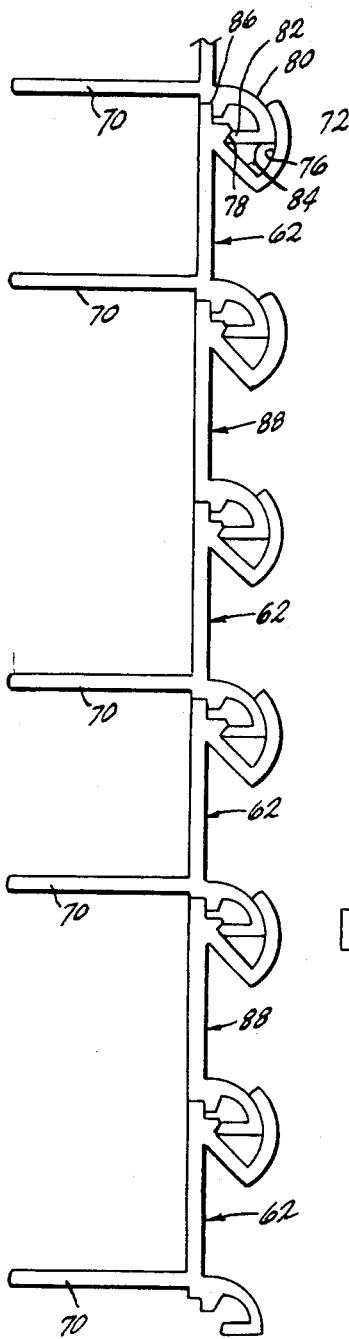
FIG. 5 is a fragmentary side elevational view of a modified arrangement of the conveyor assembly of FIG. 1.

The articles to be discharged will be stored between dividers 70, and if it is desired to vary the dimensions of the space between two adjacent dividers 70, this can be accomplished by inserting a modified strip or element 88, such as is shown in FIG. 5, wherein the divider 70 has been omitted. Thus, in certain selected locations along the length of the endless flexible conveyor assembly, the space between two adjacent dividers 70 has been substantially increased in dimension.

Figure 2:
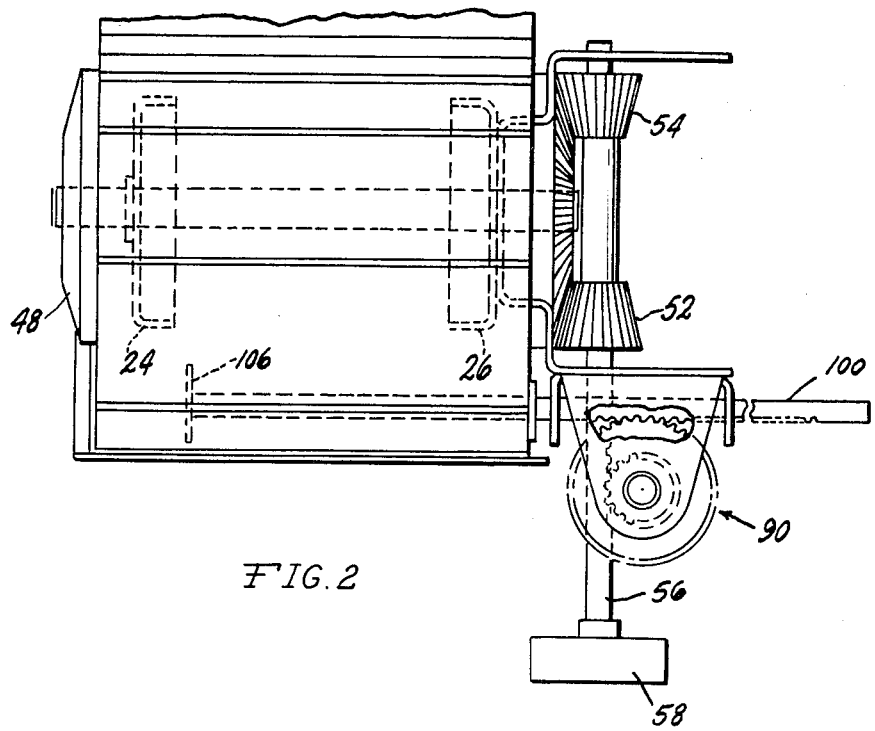
FIG. 2 is a fragmentary top plan view of the embodiment illustrated in FIG. 1.
Figure 3:
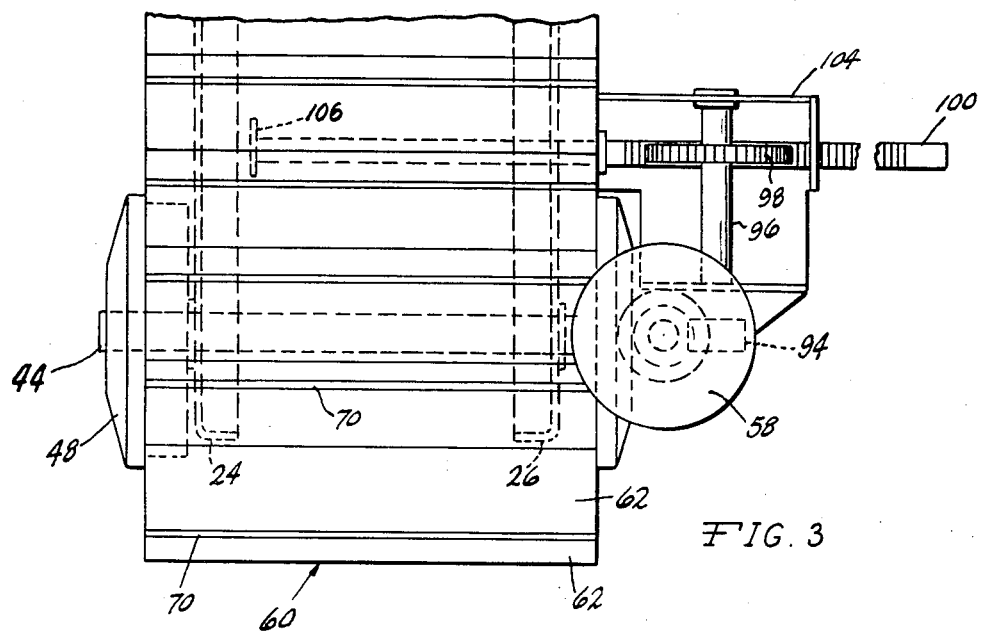
FIG. 3 is a fragmentary front elevational view of the embodiment illustrated in FIG. 1.
Figure 4:
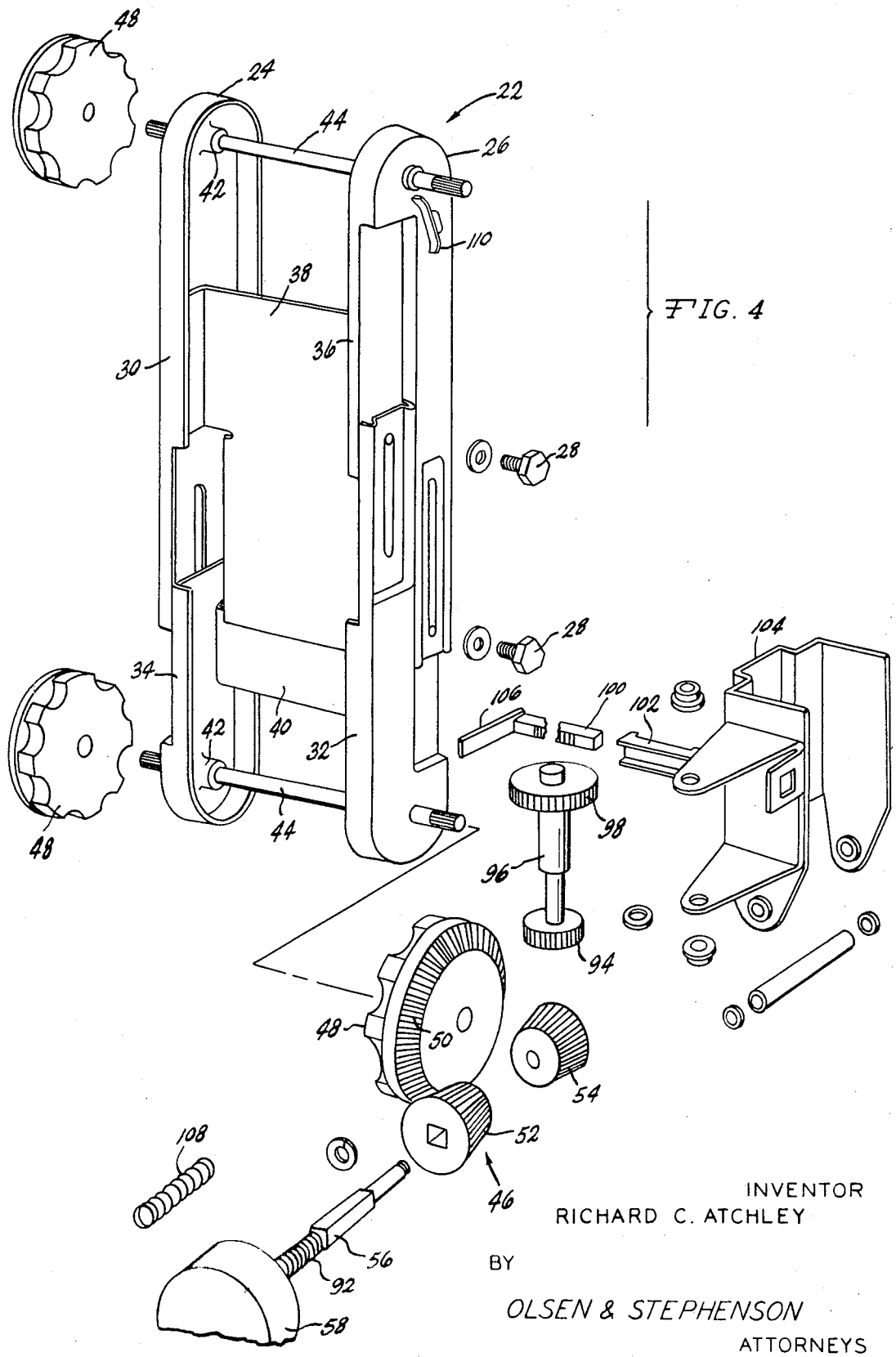
FIG. 4 is an exploded perspective view of the guide rail assembly and the ejector mechanism of the embodiment of the invention illustrated in FIG. 1.

Various suitable arrangements can be employed in the present invention for ejecting articles positioned between adjacent dividers 70. In the embodiment illustrated in FIGS. 1-4, an ejector mechanism 90 is provided which is adapted to be manually operated by axial movement of the control knob 58. For this purpose the shaft 58 is provided at its one end with a circular rack 92 and an eject pinion 94 is in mesh therewith. The eject pinion 94 is keyed to the shaft 96 for turning the second eject pinion 98 which in turn is in mesh with the longitudinally movable rack 100. The latter is positioned in the bearing 102 which in turn is supported in the gear drive and rack pinion support mounting frame 104. An ejector shoe 106 is fixed to the end of the rack 100 so that when the rack 100 is moved longitudinally, the ejector shoe 106 can travel through the space between two adjacent dividers 70 to displace any article therefrom through the ends of the dividers 70, and through an access means or closure door, not shown. Thus, this arrangement is suitable for discharging articles from the side of the housing assembly 12 or shield 14. From the foregoing description it is to be understood that when the control knob 58 is moved to the left, as viewed in FIG. 1, the rack 92 will cause rotation of the pinions 94 and 98 so as to advance the rack 100 longitudinally between two dividers 70 of the endless flexible conveyor assembly 60, and when the control knob is released, the spring 108 will return the control knob to the illustrated position in FIG. 1 and the ejector shoe 106 will be withdrawn from between the adjacent dividers 70. FIGS. 2 and 3 show the rack ejector 106 in its advanced position. After return of the rack 100, the control knob 58 will be available for turning the one sprocket 48 for advancing or retracting the conveyor assembly 60 to a desired location where another pair of dividers 70 are located in alignment with the ejector shoe 106. For the purpose of centering the pair of adjacent dividers 70 with respect to the ejector shoe 106, a suitable spring clip 110, FIG. 4, may be employed for meshing with the concave surfaces 74 of the sprocket 48. Also, as shown in FIG. 1, a solenoid actuated pin mechanism 112 may be employed for locking the sprocket 48 in a fixed position to prevent unauthorized rotation of the conveyor assembly 60, should this feature be desired. It will be understood that in a coin vending device, a suitable electric circuit can be employed to release the mechanism 112 when a coin has been inserted into the machine permitting authorized use of the machine.

Figure 6:
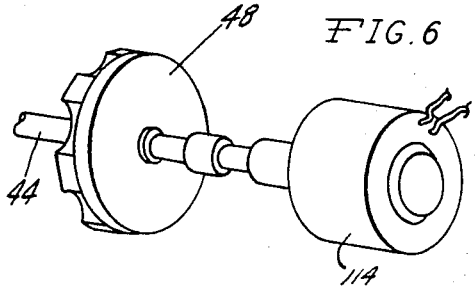
FIG. 6 is a fragmentary perspective view illustrating a modified arrangement for operating the conveyor drive assembly from a remote location.
Figure 7:
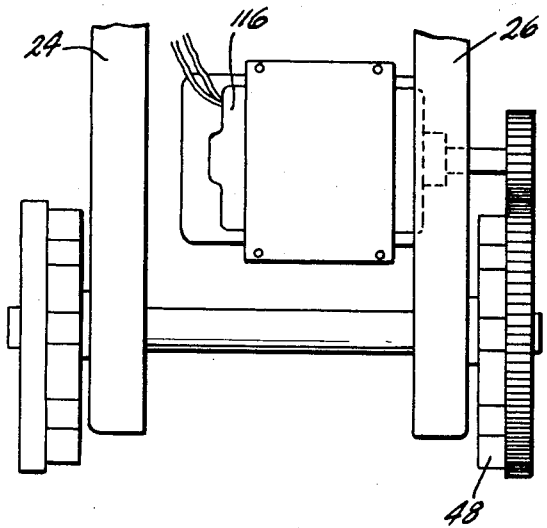
FIG. 7 is a fragmentary front elevation of a modified arrangement for operating the conveyor drive assembly through a gear drive.
Figure 8:
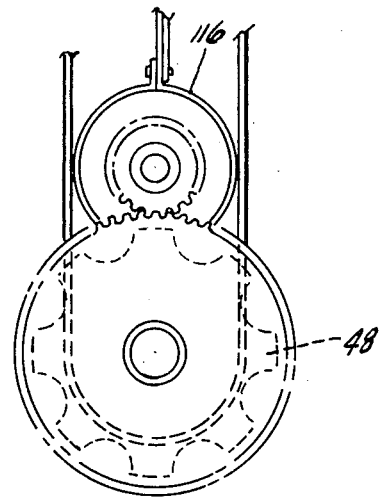
FIG. 8 is a fragmentary side elevational view of the embodiment illustrated in FIG. 7.

In the embodiment of the invention illustrated in FIGS. 1-4, the endless flexible conveyor assembly 60 is driven through a gear drive in response to manual turning of the control knob 58. If desired, the one sprocket 48 can be driven directly from a remote location through an electric motor 114. Also, if it is desired to utilize a gear train for driving the one sprocket 48, a remote control means can also be provided for driving through an electric motor 116, as is shown in FIGS. 7 and 8. It will also be recognized that a direct drive such as shown in FIG. 6 can also be used in which a manually operated control knob is directly connected to the shaft 44.

Figure 9:
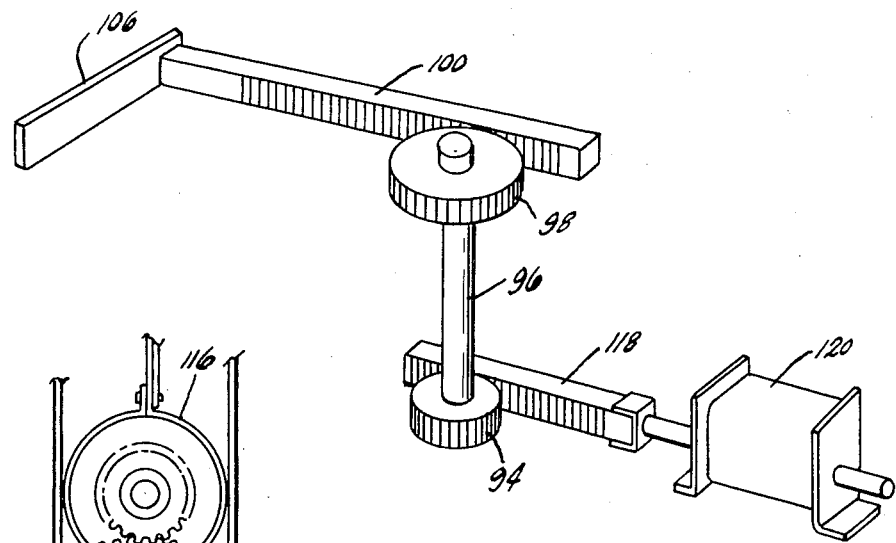
FIG. 9 is a fragmentary perspective view of the ejector mechanism showing a modified arrangement for operating the ejector mechanism from a remote location.

Remote control means can also be used to actuate the ejector shoe 106, if this should be desired. As shown in FIG. 9, a rack 118 can be placed in mesh with the pinion 94, and the rack 118 can be connected to a solenoid 120 which can be actuated from a remote location for advancing and retracting the rack 118, and thereby advancing and retracting the ejector shoe 106.

Figure 10:
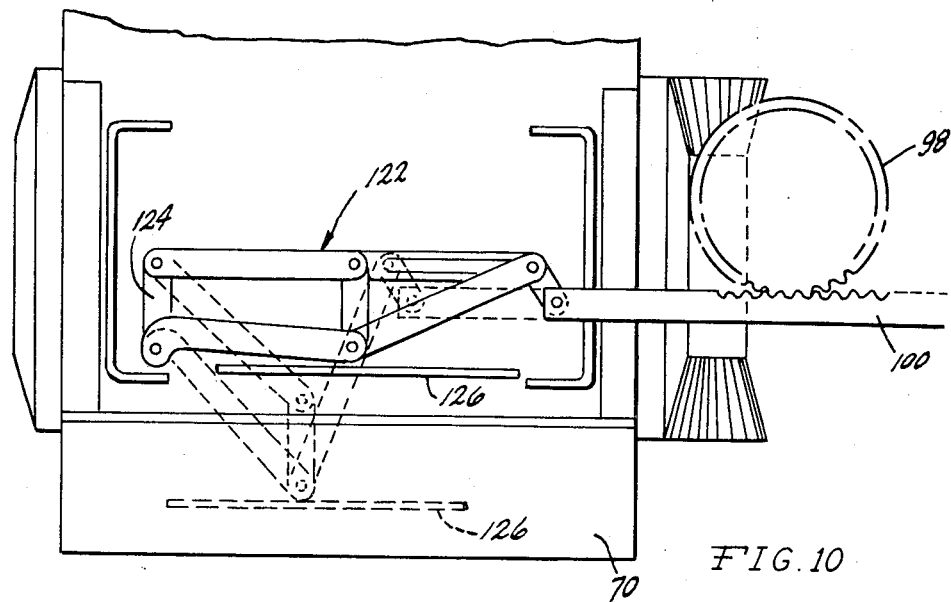
FIG. 10 is a fragmentary top plan view illustrating a modified form of the ejector mechanism adapted for use when the access opening is located in the shield or the front wall of the housing for the article dispensing apparatus.
Figure 11:
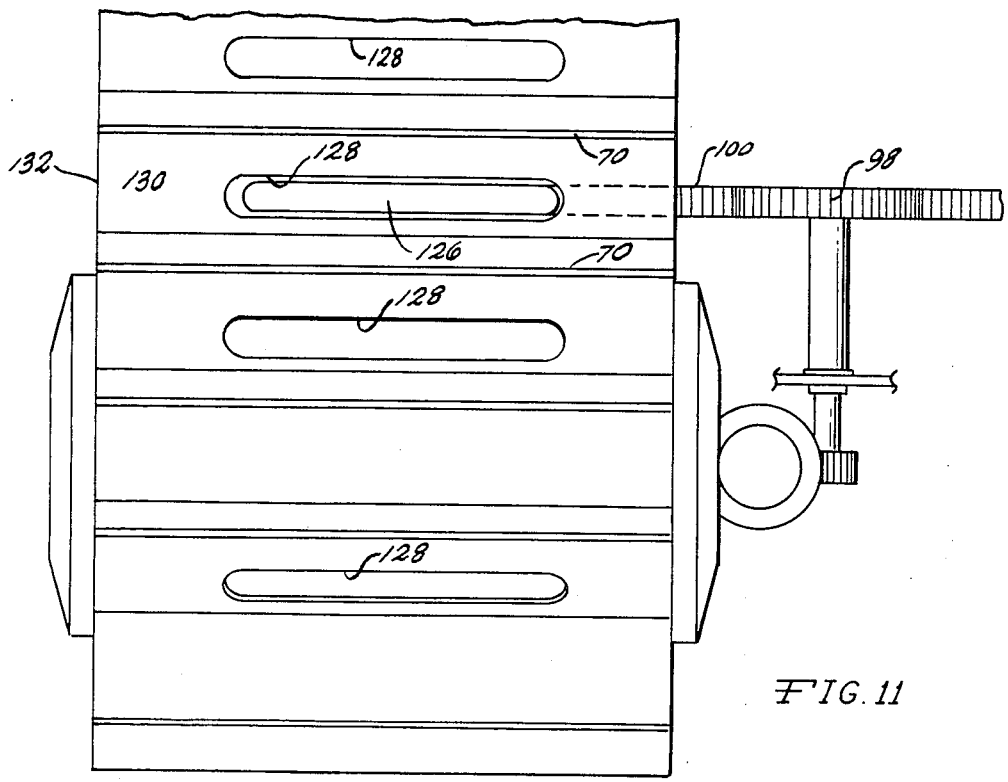
FIG. 11 is an enlarged fragmentary front elevational view illustrating the modified form of the conveyor assembly that is used with the embodiment of FIG. 10.

It is also contemplated that an ejector mechanism may be used for ejecting articles from between adjacent dividers 70 through a closure door located in the front of the shield 14. Attention is directed to FIGS. 10 and 11 for a brief description of such an arrangement. As there shown, the rack 100 has affixed to its forward end a linkage 122 which is also connected at 124 to a stationary bracket, the linkage 122 being constructed and arranged so that when the rack 100 moves from its solid line position shown in FIG. 10 to its broken line position, the ejector shoe 126 will be moved from its solid line position to its broken line position. As can be seen, the shoe 126 is adapted to travel through a slot 128 that is located in the plate portion 130 of each of the modified conveyor elements or strips 132. A suitable closure door or access means, not shown, will be located on a level with the space occupied between the adjacent dividers 70 located forward of the ejector shoe 126.

Figure 12:
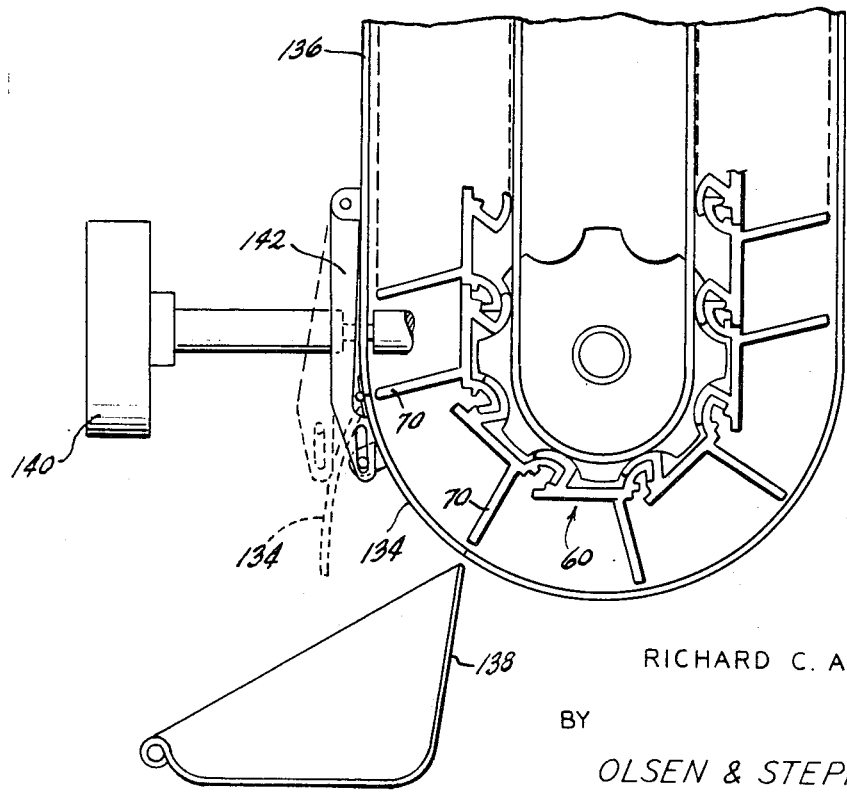
FIG. 12 is a fragmentary side elevational view of an embodiment of the invention wherein ejection is accomplished by gravity.

In some instances it may be desired to provide for ejection of the articles to be dispensed without the use of a mechanical ejector, and for an arrangement of this type wherein gravity is employed for discharging the articles from a space between adjacent dividers 70, attention is directed to the embodiment of the invention shown in FIG. 12. As there shown, an access means or closure door 134 is hingedly connected to the product retaining shield 136 over an opening in the lower portion thereof. A vending chute 138 is mounted adjacent to the opening in the shield 136 so that when the closure door 134 is moved to the open position shown in broken lines in FIG. 12, an article between the dividers 70 will fall by gravity into the chute 138. In this embodiment of the invention, the control knob 140 is suitably connected to the door 134 by means of a linkage 142 which will serve to pull open the door 134 when the control knob is moved to the left as viewed in FIG. 12, and when the knob is returned to its original position, the closure door 134 will be returned to the solid line position shown in this Figure.

It is also contemplated that an access means or closure door may be provided at the top of the housing assembly and remote control means can serve to open the closure door. For a showing of such an arrangement, attention is directed to FIG. 13 wherein the closure door 140 can be moved from its closed position shown in solid lines to its open position shown in broken lines by actuation of the remotely controlled solenoid 142.

The present invention can also be readily adapted for use to provide an enlarged display chamber for the article to be observed and dispensed. Attention is directed to FIGS. 14 and 15 which illustrate an arrangement of this character. As there shown an idler sprocket 48 is located along a length of modified rail 144 which is shaped so that the conveyor assembly must travel over the curved segment 146 to flare apart the dividers 70. The article between these dividers can then be more readily inspected through the modified transparent shield 148 which includes the access means or closure door 150.

In this embodiment, idler arms 152 are mounted on the idler shaft 154 and carry a plurality of idler wheels 156 which are adapted to travel on the outer surfaces of the plate portions 68. The dividers 70 have been notched as at 158 to permit the conveyor elements or strips 62 to travel passed the wheels 156. The rails 144 may be made of a flexible plastic material, if desired, in which case the rails would be retained in place by the spring elements 160.

It is claimed:

1. Article dispensing apparatus comprising two parallel endless guide rails, a plurality of sprockets supported adjacent to said rails, said sprockets having a series of concave circular surfaces around their peripheries, an endless flexible conveyor assembly for travel on said rails including a series of conveyor elements hingedly connected edge to edge by interlocking edge portions, each element defining a plate portion which has a divider projecting from one of its surfaces in a direction away from said rails and male and female edge portions projecting from the other surface in a direction toward said rails, each male edge portion of one element extending lengthwise through the female edge portion of the next adjacent element so that said edge portions are interlocked with mating edge portions of next adjacent elements to provide the hinge connections, each female edge portion having an external circular surface, said hinge connections being adapted to travel on said rails and the external circular surfaces of said female portions meshing with said sprockets by fitting into said concave circular surfaces so that turning of one of said sprockets will cause said endless flexible conveyor assembly to travel on said rails, and a housing assembly enclosing the conveyor assembly and having access means for removal of an article located in the space between two dividers that are adjacent to one another.

2. Article dispensing apparatus that is defined in claim 1, wherein said rails are selectively extensible and contractable in length, and said elements are releasably connected together so that the number of said elements can be selectively varied to fit the selected length of said rails.

3. Article dispensing apparatus that is defined in claim 1, wherein modified elements lacking said dividers are inserted in place of certain of the first-named elements to vary the spacing between dividers remaining in said conveyor assembly.

4. Article dispensing apparatus that is defined in claim 1, wherein each female edge portion has a segment of a concave cylindrical surface opposed by a groove located at the center of said concave cylindrical surface, each male edge portion has a segment of a convex cylindrical surface of the same radius as said concave cylindrical surface and a tongue having its extremity at the center of said convex cylindrical surface, each male edge portion of one strip extending lengthwise through the female edge portion of a next adjacent strip with the tongue of the male edge portion seated in the groove of the female edge portion and with the concave and convex cylindrical surfaces in sliding engagement for relative pivotal movement about the center of said surfaces, the interlocking male and female edge portions having abuting edge surfaces to limit said relative pivotal movement in one direction, said edge portions also having abutment means to limit said relative pivotal movement in the other direction to provide when so pivoted a preselected angular position of one element relative to the next adjacent element.

5. Article dispensing apparatus that is defined in claim 1, wherein said access means includes a closure door on said housing assembly, said conveyor assembly being movable on said rails to a position wherein the space between said two dividers is in alignment with said closure door.

6. Article dispensing apparatus that is defined in claim 5, wherein a drive mechanism is operatively connected to one of said sprockets for positioning said conveyor assembly so that the space between any selected pair of dividers is in alignment with said closure door.

7. Article dispensing apparatus that is defined in claim 6, wherein said drive mechanism includes a manually rotatable control knob supported on a shaft projecting from said housing and a gear train between said shaft and said one sprocket.

8. Article dispensing apparatus that is defined in claim 6, wherein said drive mechanism includes a remotely controlled motor means coupled to said one sprocket for rotating the same.

9. Article dispensing apparatus that is defined in claim 5, wherein an ejector mechanism is mounted adjacent to said conveyor assembly for ejecting an article from the space between said two dividers.

10. Article dispensing apparatus that is defined in claim 9, wherein said ejector mechanism includes a gear rack on one end of which an ejector shoe is mounted for movement through said space, a manually actuatable control knob, and a gear train between said rack and said knob for advancing and retracting said rack in response to movement of said knob.

11. Article dispensing apparatus that is defined in claim 9, wherein said ejector mechanism includes a gear rack on one end of which an ejector shoe is mounted for movement through said space, and a remotely controlled motor means is coupled to said rack for moving the same.

12. Article dispensing apparatus that is defined in claim 5, wherein a drive mechanism is operatively connected to one of said sprockets for positioning said conveyor assembly so that the space between any selected pair of dividers is in alignment with said closure door, and an ejector mechanism is mounted adjacent to said conveyor assembly for ejecting an article from the space between said two dividers.

13. Article dispensing apparatus that is defined in claim 12, wherein said drive mechanism includes a manually rotatable control knob supported on a shaft mounted for rotatable and axial movement and projecting from said housing, and a gear train mounted between said shaft and said one sprocket so that said sprocket will rotate in response to turning of said control knob, and said ejector mechanism includes said control knob and its associated shaft, a gear rack on which an ejector shoe is operatively mounted for movement through said space, and a gear train between said rack and said shaft for advancing and retracting said rack in response to axial movement of said knob and its shaft.

14. Article dispensing apparatus that is defined in claim 13, wherein the ejector shoe of said ejector mechanism is mounted on the one end of said rack for movement parallel with said rack through said space.

15. Article dispensing apparatus that is defined in claim 14, wherein the access means of said housing assembly includes a closure door that is located on one side wall of the housing assembly laterally of said dividers.

16. Article dispensing apparatus comprising two parallel endless guide rails, a plurality of sprockets supported adjacent to said rails, an endless flexible conveyor assembly for travel on said rails including a series of conveyor elements hingedly connected edge to edge by interlocking edge portions, each element defining a plate portion which has a divider projecting from one of its surfaces in a direction away from said rails and male and female edge portions projecting from the other surface in a direction toward said rails, said edge portions being interlocked with mating edge portions of next adjacent elements to provide the hinge connections, said hinge connections being adapted to travel on said rails and to mesh with said sprockets so that turning of one of said sprockets will cause said endless flexible conveyor assembly to travel on said rails, and a housing assembly enclosing the conveyor assembly and having access means for removal of an article located in the space between two dividers that are adjacent to one another, said access means including a closure door on said housing assembly, said conveyor assembly being movable on said rails to a position wherein the space between said two dividers is in alignment with said closure door, a drive mechanism operatively connected to one of said sprockets for positioning said conveyor assembly so that the space between any selected pair of dividers is in alignment with said closure door, and an ejector mechanism mounted adjacent to said conveyor assembly for ejecting an article from the space between said two dividers, said drive mechanism including a manually rotatable control knob supported on a shaft mounted for rotatable and axial movement and projecting from said housing, and a gear train mounted between said shaft and said one sprocket so that said sprocket will rotate in response to turning of said control knob, said ejector mechanism including said control knob and its associated shaft, a gear rack on which an ejector shoe is operatively mounted for movement through said space, and a gear train between said rack and said shaft for advancing and retracting said rack in response to axial movement of said knob and its shaft, the ejector of said ejector mechanism being mounted on a linkage which is connected to one end of said rack, and each of said plate portions has a slot through which said ejector shoe can travel when aligned therewith perpendicular to the path of movement of said rack.

17. Article dispensing apparatus that is defined in claim 16, wherein the access means of said housing assembly includes a closure door that is located on the front wall of the housing assembly forward of said dividers.

18. Article dispensing apparatus comprising two parallel endless guide rails, a plurality of sprockets supported adjacent to said rails, an endless flexible conveyor assembly for travel on said rails including a series of conveyor elements hingedly connected edge to edge by interlocking edge portions, each element defining a plate portion which has a divider projecting from one of its surfaces in a direction away from said rails and male and female edge portions projecting from the other surface in a direction toward said rails, said edge portions being interlocked with mating edge portions of next adjacent elements to provide the hinge connections, said hinge connections being adapted to travel on said rails and to mesh with said sprockets so that turning of one of said sprockets will cause said endless flexible conveyor assembly to travel on said rails, and a housing assembly enclosing the conveyor assembly and having access means for removal of an article located in the space between two dividers that are adjacent to one another, said conveyor assembly being movable on said rails to a position wherein the space between said two dividers is in alignment with said closure door, said rails having an elongated straight portion interrupted between its ends by an outwardly projecting portion over which said conveyor assembly is arranged to travel so that each pair of dividers adjacent to one another will spread apart while traveling over said projecting portion, and said access means being a closure door located in the wall of the housing assembly adjacent to said projecting portion.

* * * * *